US009230717B1

(12) United States Patent
Manna (10) Patent No.: US 9,230,717 B1
(45) Date of Patent: Jan. 5, 2016

(54) UNIVERSAL CABLE JACKET REMOVAL TOOL (75) Inventor: Eric D. Manna, Moorestown, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1073 days.

(21) Appl. No.: 13/183,650

(22) Filed: Jul. 15, 2011

(51) Int. Cl.
H01B 15/00 (2006.01)
H02G 1/12 (2006.01)

(52) U.S. Cl.
CPC ............ *H01B 15/006* (2013.01); *H02G 1/126* (2013.01); *H02G 1/127* (2013.01); *H02G 1/1217* (2013.01); *H02G 1/1297* (2013.01); *Y10S 83/924* (2013.01); *Y10S 83/947* (2013.01)

(58) Field of Classification Search
CPC ... H02G 1/1217; H02G 1/1239; H02G 1/126; H02G 1/1297; H02G 1/127; H01B 15/006; B26B 25/005; B26D 3/001; Y10S 83/924; Y10S 83/947
USPC ........ 30/90.4, 90.8, 90.9; 81/9.41, 9.42, 9.51; 83/924, 947
IPC ................ H02G 1/1217, 1/1239, 1/126, 1/1297
See application file for complete search history.

(56) References Cited

U.S. PATENT DOCUMENTS

| 3,462,052 | A | | 8/1969 | Wagner |
| 3,537,350 | A | | 11/1970 | Scott |
| 3,590,666 | A | | 7/1971 | Langer |
| 3,659,483 | A | | 5/1972 | Matthews |
| 3,835,738 | A | | 9/1974 | Kellum et al. |
| 3,988,826 | A | * | 11/1976 | Heikkala ........................ 30/90.4 |
| 4,498,820 | A | | 2/1985 | Brennan |
| 4,543,717 | A | | 10/1985 | Luka |
| 4,656,893 | A | | 4/1987 | Hudson |
| 4,741,104 | A | | 5/1988 | Noon |
| 4,753,007 | A | * | 6/1988 | Weller ............................ 30/90.3 |
| 4,796,347 | A | | 1/1989 | Aguillen, Jr. et al. |
| 5,438,753 | A | | 8/1995 | Stepan |
| 5,542,327 | A | * | 8/1996 | Schultz ............................ 83/861 |
| 5,806,188 | A | * | 9/1998 | Caraballo ....................... 30/92.5 |
| 6,510,611 | B2 | | 1/2003 | Edwards et al. |
| 7,171,753 | B2 | | 2/2007 | Korczak et al. |

* cited by examiner

*Primary Examiner* — Clark F Dexter
(74) *Attorney, Agent, or Firm* — Howard Kaiser (57) ABSTRACT According to typical inventive practice, a cable is grasped by a Kellum grip and is positioned through the topside "V"-notch of an "M"-structure. Two wires engage pulleys and a ratchet distanced from the pulleys. The pulleys are joined with a grip plate, attached at an axial end of the Kellum grip. The ratchet is joined with a ratchet plate, proximate and/or attached to the "M"-structure. The "M"-structure has joined therewith three blade wheels having cutting orientations in the same linear direction. The blade wheels are situated interiorly and perpendicularly in correspondence to the geometric sides of the inverted triangle defined by the "V"-notch. Each blade wheel is adjustable to suit the diameter of the cable positioned through the "V"-notch. Ratcheting of the wires moves the ratchet plate and hence the "M"-structure, resulting in creation via the blade wheels of three parallel slices in the cable along its axis.

11 Claims, 5 Drawing Sheets

UNIVERSAL CABLE JACKET REMOVAL TOOL

BACKGROUND OF THE INVENTION

The present invention relates to electrical cables such as electrical power cables, more particularly to methods and apparatuses for removing an outer layer (e.g., a jacket or insulative layer) from an electrical cable.

Generally speaking, commercially available jacket removal tools are imprecise hand tools that are difficult and time-consuming to operate. The conventional approach to removing a jacket from an electrical cable involves manipulation of a hand tool that does not attach to the cable. During the cutting of a cable, both the cable and the hand tool's cutting blades are unsupported and in free air. Use of these hand tools requires significant training and on-the-job experience. They tend to be variable both in their service life and in the quality of the electrical terminations that they permit. Their use requires lengthened and labor-intensive work, and this considerable amount of energy and effort yields inconsistent results.

The following United States patents, each of which is hereby incorporated herein by reference, are informative regarding traditional practice of cable jacket removal: Korczak et al. U.S. Pat. No. 7,171,753 B2 issued 6 Feb. 2007; Edwards et al. U.S. Pat. No. 6,510,611 B2 issued 28 Jan. 2003; Stepan U.S. Pat. No. 5,438,753 issued 8 Aug. 1995; Noon U.S. Pat. No. 4,741,104 issued 3 May 1988; Hudson U.S. Pat. No. 4,656,893 issued 14 Apr. 1987; Luka U.S. Pat. No. 4,543,717 issued 1 Oct. 1985; Matthews U.S. Pat. No. 3,659,483 issued 2 May 1972; Langer U.S. Pat. No. 3,590,666 issued 6 Jul. 1971; Scott U.S. Pat. No. 3,537,350 issued 3 Nov. 1970; Wagner U.S. Pat. No. 3,462,052 issued 19 Aug. 1969.

SUMMARY OF THE INVENTION

In view of the foregoing, an object of the present invention is to provide an improved methodology for removing a jacket from an electrical power cable.

The present invention's cable-cutting device represents a fast, precise, and easily operated tool for removal of thick jacket material from cabling (e.g., naval shipboard cabling or utility power system cabling) across a broad range of cable diameters and jacket thicknesses.

According to typical inventive practice, a cable incision device includes a generally M-shaped member, a horizontal cross-member, a first blade, a second blade, a third blade, a Kellum-based mechanism, and a ratcheting mechanism.

The generally M-shaped member has an isosceles triangular notch characterized by a vertical geometric bisector, a first angled edge, and a second angled edge, the angled edges meeting at the geometric apex of the notch. The horizontal cross-member is attached to the generally M-shaped member so as to traverse the triangular notch, the cross-member perpendicular to the bisector and positionally adjustable along the vertical bisector. The first blade is associated with and perpendicular to the first edge and is positionally adjustable along the first angled edge. The second blade is associated with and perpendicular to the second edge and is positionally adjustable along the second angled edge. The third blade is associated with the bar so as to be coincident with the vertical bisector, and is positionally adjustable along the vertical bisector in accordance with the positional adjustability of the cross-member along the vertical bisector.

The Kellum-based mechanism is capable of gripping a segment of a cable characterized by a longitudinal axis. The ratcheting mechanism adjoins the generally M-shaped member and is capable of ratcheting plural wires connecting the Kellum-based mechanism to the ratcheting mechanism so that the generally M-shaped member is caused by the ratcheting to move toward the Kellum-based mechanism.

Steps including (i) gripping the cable, (ii) placing the cable through the notch, (iii) adjusting at least one of the first blade, the second blade, and the third blade, and (iv) ratcheting the wires, result in three parallel incisions in the cable along the longitudinal axis of the cable. The first incision is made by the first blade, the second incision is made by the second blade, and the third incision is made by the third blade.

According to conventional cable jacket removal, the cable jacket is cut spirally while the cable is held; the holding force and the cutting force operate in different directions at once, with continual repositioning of the hand tool. In contrast, the present invention's cable jacket removal tool eliminates the need for the practitioner to provide both the holding force and the cutting force.

As distinguished from conventional devices, the inventive device provides mechanical advantage to reduce the forces required to complete the task. The inventive device cuts linearly, as opposed to the spiral cutting by conventional devices. Typical inventive embodiments implement three blades for correspondingly creating three parallel incisions along the longitudinal axis of the cable jacket. Among the other features of the present invention is its utilization of a Kellum grip to provide all of the oppositional force to the cutting motion. Conventional cable removal methodology requires the operator to provide all of the opposition force to the cutting motion. Furthermore, the present invention's combination including a tensioning yoke assembly and wire-tension pulleys reduces the force required to perform the cutting action.

In addition, the present invention features adjustability of its cutting blades. According to typical inventive practice, the two oppositely angled lateral cutting blades are adjustable both horizontally and vertically. The third cutting blade is adjustable by means of adjustment of the horizontal cross-member (e.g., bar) to which the third cutting blade is attached. Each form of adjustability includes positional locking. By virtue of its multi-directional, multi-bladed adjustment capabilities, the present invention can accommodate practically any cable diameter and jacket type while affording accurate and reliable cutting results.

The terms "rotational cutting blade," "rotational blade," "cutting blade wheel," "cutting wheel," "blade wheel," "wheel blade" and the like are used synonymously herein to refer to a circular cutting blade that is rotatable about its geometric axis.

According to typical operation of the inventive device, the inventive device is slipped over the end of the cable with the inventive device's Kellum-grip clamp proceeding first. The cable is slid up into the inventive device's tightening (ratcheting) mechanism, which is at the opposite end of the inventive device. The Kellum-grip clamp is pulled taut to firmly attach the inventive device to the cable. The cross-member (and hence the top cutting wheel, coupled therewith) is vertically adjusted. The two side cutting wheels, coupled with the M-shaped plate, are adjusted in terms of blade depths and translational positions along the respective oblique V-notched edges. The three cutting wheels are thus adjusted to match the cable diameter and jacket thickness in this manner, and are then locked into place. The tensioning wires are fed into the tightening mechanism, which is then actuated so that the jacket is cut, in three parallel incisions, along the desired axial length of the cable. The Kellum grip mesh is longitudinally-axially contracted, and the inventive device is removed from the cable. A conventional hand tool is used to make a final, circular cut in the jacket, thus completing the jacket removal process.

As typically practiced, the present invention's "universal cable jacket removal tool" attaches to the cable being worked. The present invention affords a faster, easier cutting action than conventional hand tools. A typical inventive device utilizes highly adjustable cutting arms built into an "M" fixture/support, along with a block-rectangle cross member. The inventive device anchors to the cable via a Kellum grip having a yoke ring end. On the other end of the inventive device is a second yoke ring, which is attributed with a tension cable-ratcheting take-up mechanism. According to some inventive embodiments, a second "M" fixture/support has rollers to smooth inventive operation. The cutting "M" fixture/support is situated between the two yoke rings. The movement of the ratchet yoke ring toward the Kellum yoke ring, via ratcheting action, causes the cutting of the cable jacket. Small pulleys in the Kellum yoke ring provide mechanical advantage, and the Kellum grip's opposition to the cutting force improves ease of operation.

Other objects, advantages, and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 7 and FIG. 8 together illustrate connection, via two wires, between the wire-ratcheting component and the cable-gripping component.

DESCRIPTION OF EXEMPLARY EMBODIMENTS OF THE INVENTION

Referring now to FIG. 1 through FIG. 4, cutting assembly 10 is a mechanical unit representing the cutting component of a cable incision apparatus in accordance with typical practice of the present invention. Cutting assembly 10 includes: an "M"-shaped support plate 12; a horizontal crossbar 14; movable clips 34a and 34b; guide rails 18a and 18b; rail mounts 19a and 19b; bar lock-down nuts 22a and 22b; rotational cutting blades 30a, 30b, and 30c; blade rotational fastener 32; and, clip lock-down nuts 36a and 36b. M-shaped plate 12 is a planar support structure that is configured to have a "V"-shaped notch 80, two oblique hold-down slots 17a and 17b, and two vertical hold-down slots 20a and 20b.

Figure 1:
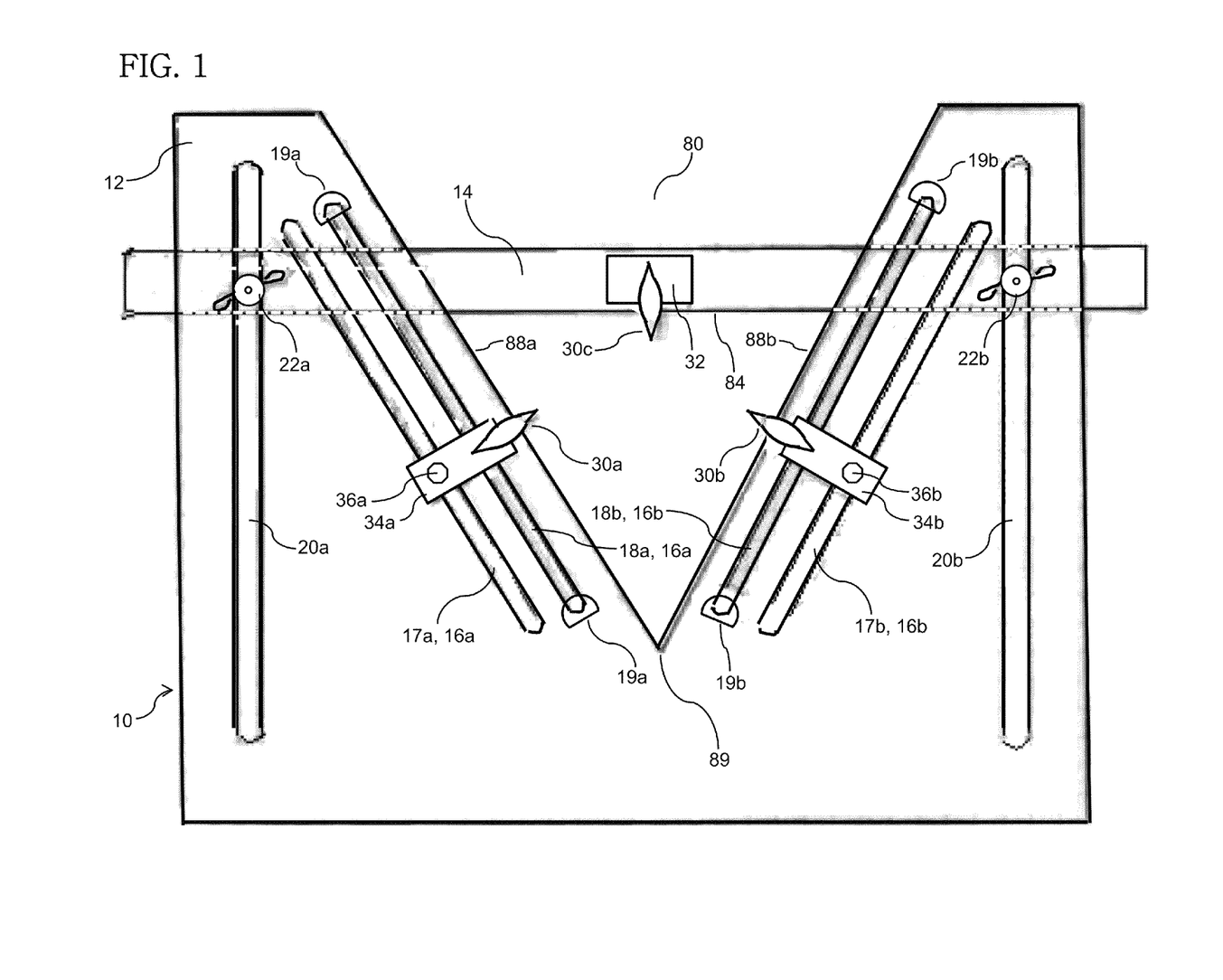
FIG. 1 is a frontal elevation view of an embodiment of the cutting component of a cable-cutting device in accordance with the present invention.
Figure 2:
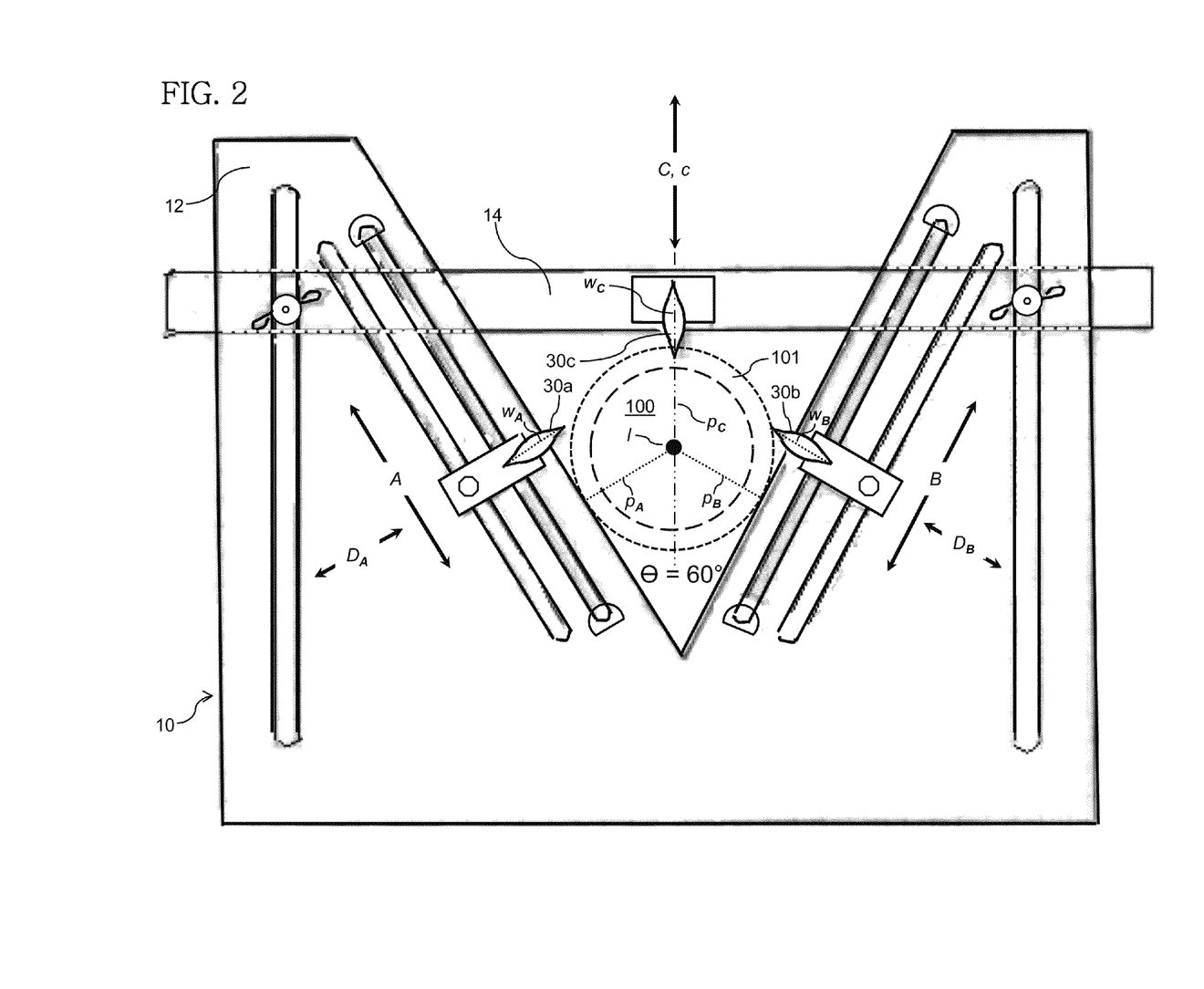
FIG. 2 is the view of the inventive embodiment shown in FIG. 1, additionally illustrating blade adjustment directions and a cable positioned for cutting.

Blades 30a and 30b are attached to movable clips 34a and 34b, respectively. Guide rails 18a and 18b are attached to M-shaped support plate 12 via rail mounts (e.g., including retainer clips) 19a and 19b, respectively. Guide rail 18a and hold-down slot 17a are parallel to each other and are the main constituents of a track 16a for blade 30a. Similarly, guide rail 18b and hold-down slot 17b are parallel to each other and are the main constituents of a track 16b for blade 30b. Blade 30a is movable back-and-forth along track 16a via movable clip 34a (which engages guide rail 18a) and clip lock-down nut 36a (which engages movable clip 34a and hold-down slot 17a). Similarly, blade 30b is movable back-and-forth along track 18b via movable clip 34b (which engages guide rail 18b) and clip lock-down nut 36b (which engages movable clip 34b and hold-down slot 17b).

As shown in FIGS. 1 and 2, blade 30a is movable along track 16a at about a sixty-degree angle left-wise upward with respect to horizontality; blade 30b is movable along track 16 at about a sixty-degree angle right-wise upward with respect to horizontality. Movable clip 34a can be locked in place, thereby fixing blade 30a, by fastening clip lock-down nut 36a with respect to hold-down slot 17a. Similarly, movable clip 34b can be locked in place, thereby fixing blade 30b, by fastening clip lock-down nut 36b with respect to hold-down slot 17b.

Figures 3, 4, 5:
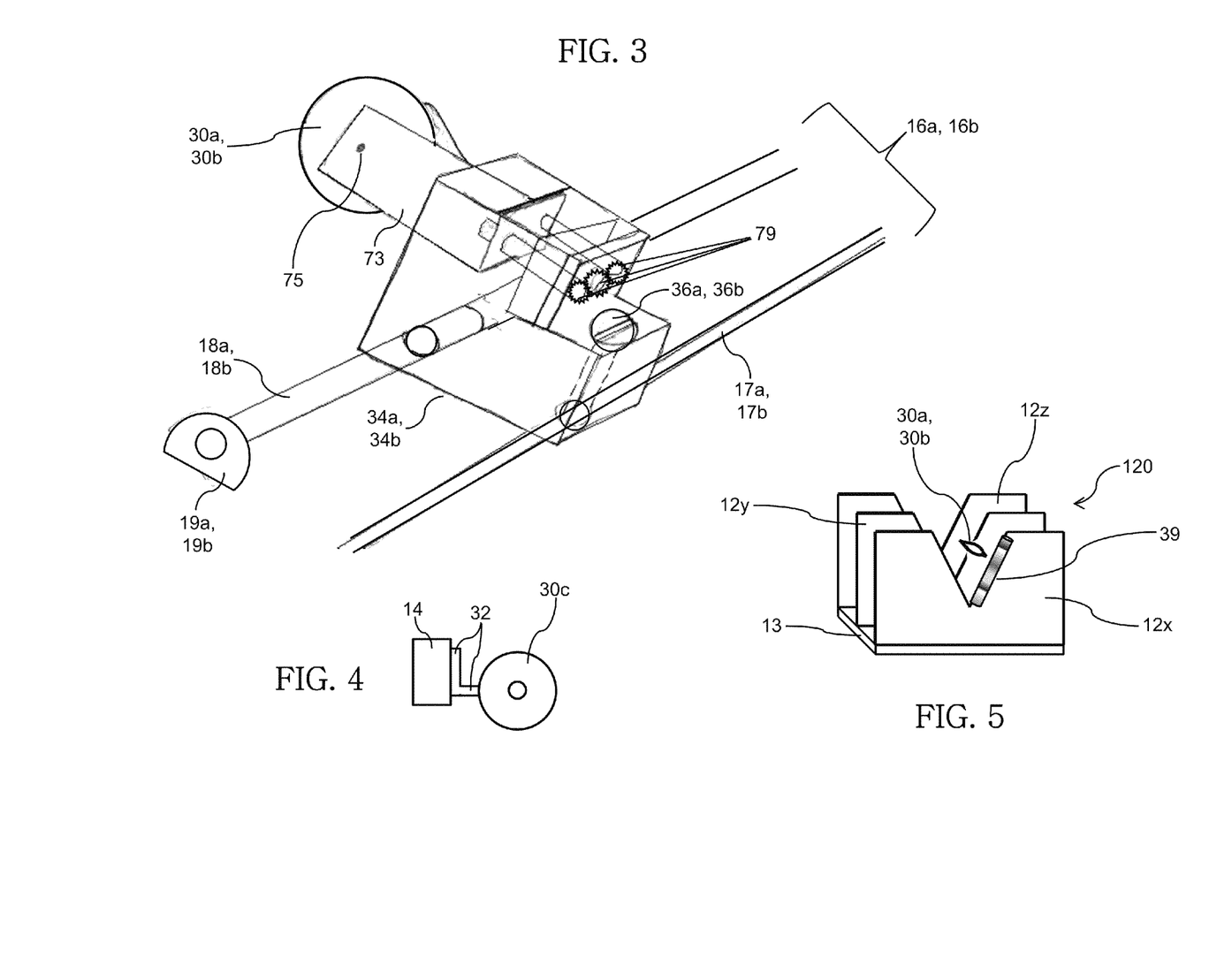
FIG. 3 is a perspective view, enlarged and more detailed, of an inventive embodiment of either of the two blade wheel mechanisms that are adjustable along the angled sides of the V-shaped valley of the M-shaped member, such as shown in FIG. 1 and FIG. 2.
FIG. 4 is a side elevation view of an inventive embodiment of the blade wheel mechanism that is affixed to the vertically adjustable horizontal cross-member, such as shown in FIG. 1 and FIG. 2.
FIG. 5 is a perspective view of an inventive embodiment of a cutting assembly having plural parallel M-shaped members (e.g., is multi-plated). The cutting assembly shown in FIG. 5 is similar to or includes the cutting component depicted in FIG. 1 and FIG. 2.

FIG. 4 is illustrative of the fixed-blade combination including blade rotational fastener 32 and wheel blade 30c. In the view of FIGS. 1 and 2, the cross-member 14 is behind the M-shaped member 12. Blade rotational fastener 32 serves to affix blade 30c to horizontal crossbar 14, and to mechanically facilitate rotatability of blade 30c in a vertical geometric plane, viz., bisector c. Horizontal crossbar 14 is vertically movable along the two vertical (parallel) hold-down slots 20a and 20b. Vertical slots 20a and 20b are the main constituents of two parallel tracks for blade 30c. Crossbar 14 can be locked into place in a horizontal position, thereby fixing blade 30c with its geometric plane in a vertical position, by fastening bar lock-down nuts 22a and 22b evenly with respect to each other.

M-shaped plate 12 is attributed, open-upward in the horizontal middle of its upper edge, with the "V"-shaped notch 80. As shown in FIGS. 1 and 2, the two oblique edges 88a and 88b of V-notch 80 meet at a vertex 89 to form a vertical angle θ of about sixty degrees. Oblique edge 88a is parallel to guide rail 18a and hold-down slot 17a. Oblique edge 88b is parallel to guide rail 18b and hold-down slot 17b. Although the inventive example illustrated in FIG. 1 and FIG. 2 is characterized by angle θ=60°, inventive practice admits of angles θ in a range of acute magnitudes, usually in an approximate range between θ=45° and θ=75°.

V-notch 80 constitutes a "valley" in which can fit a cable 100 oriented perpendicular to M-shaped plate 12. Geometrically speaking, V-notch 80 can be considered, in combination with a portion of the lower edge 84 of crossbar 14, to form an inverted isosceles triangle. Edges 88a, 88b, and 84 together describe an inverted isosceles triangle having an apex 89, two equal sides 88a and 88b, a 60° angle θ between equal sides 88a and 88b, a vertical bisector c of angle θ, and a base 84 (opposite apex 89 and perpendicular to bisector c). The height of the isosceles triangle, i.e., the distance between apex/vertex 89 and crossbar lower edge 84, lies in bisector plane c, which divides M-shaped plate 12 into two approximately congruent halves.

During operation of the inventive cutting device, a cable 100 having a geometric longitudinal axis l is disposed perpendicularly through the V-notch 80 so as to rest on the two oblique edges 88a and 88b that form the V-shape of V-notch 80, such as illustrated in FIG. 2. Cable 100 includes an outside electrical-insulation layer 101, also referred to herein as a "jacket." Once cable 100 is appropriately placed through V-notch 80, blades 30a, 30b, and 30c can be adjusted to suit the dimensions of cable 100, in particular the diameter of cable 100 and the thickness of its cable jacket 101.

Blade 30a is adjustable in opposite directions along oblique track 16a, as indicated in FIG. 2 by bidirectional arrow A in FIG. 2. Blade 30b is adjustable in opposite directions along oblique track 16b, as indicated by bidirectional arrow B. Blade 30c is adjustable in opposite directions along horizontal track 16c, as indicated by bidirectional arrow C, which is coincident with bisector c.

In addition to the track-wise adjustability as indicated by bidirectional arrows A and B, blades 30a and 30b are respectively attributed with "depth-wise" adjustability as indicated by bidirectional arrows $D_A$ and $D_B$. The "depth" of the blades 30a and 3b, as used herein in this sense, denotes the perpendicular extent of the blade beyond the V-notch edge. Blade 30c is afforded "depth-wise" adjustability, vis-à-vis the cable 100, by means of the cross-member 14 to which the blade 30c is attached. The respective "depths" of the three blades are adjustable in directions approximately lying in the geometric plane of the M-shaped plate.

As depicted in FIG. 1 and FIG. 2, wheel blades 30a and 30b need to be adjusted downward in directions A and B, respectively. In addition, blade 30a may need to be adjusted (either toward or away from cable 100's axial-longitudinal line l) in direction $D_A$, and/or blade 30b may need to be adjusted (either toward or away from cable 100's axial-longitudinal line l) in direction $D_B$. Moreover, wheel blade 30c may need to be adjusted (either vertically downward, i.e., toward cable 100's axial-longitudinal line l, or vertically upward, i.e., away from cable 100's axial-longitudinal line l) in direction C. Blades 30a, 30b, and 30c describe, respectively, geometric planes $w_A$, $w_B$, and $w_C$. Cable 100 is characterized along its length by three radial geometric planes, viz., planes $p_A$, $p_B$, and $p_C$, that intersect its axial-longitudinal line l and that are circumferentially spaced apart at 120-degree intervals.

As viewed in FIG. 2, radial planes $p_A$, $p_B$, and $p_C$ correspond to circumferential cable 100 positions at eight o'clock, four o'clock, and 12 o'clock, respectively. Assuming that blade 30c is properly "centered" in the inventive device, and assuming further that cable 100 is properly placed in V-notch 80, then geometric planes c, $p_C$, and $w_c$ are all vertical and coincident. Downward adjustment of blade 30a in direction $D_A$ is performed so that its geometric plane $w_A$ coincides with geometric plane $p_a$. Similarly, downward adjustment of blade 30b in direction $D_B$ is performed so that its geometric plane $w_B$ coincides with geometric plane $p_b$. Otherwise expressed, according to typical inventive practice the blades 30a and 30b are individually adjusted, either upward or downward, along the corresponding V-notch 80 slants so that blade 30a aligns with the eight o'clock position and blade 30b aligns with the four o'clock position.

In terms of depth directions $D_A$, $D_B$, and $D_C$, wheel blades 30a, 30b, and 30c are typically adjusted so that each blade cuts the jacket 101 only, and is at the desired extent of radial penetration into cable 100. Blade 30c is likely positioned correctly or nearly correctly, depth-wise, for cutting the cable jacket 101 as illustrated in FIG. 1 and FIG. 2. However, blades 30a and 30b at their depicted depths will likely extend too deeply into cable 100, i.e., beyond jacket 101, when properly positioned in alignment with eight o'clock and four o'clock, respectively. Blades 30a and 30b will require depth-wise adjustment so that they each contact cable 100 in the same manner as blade 30c.

FIG. 3 is illustrative of either of two blade-carrying combinations, one of which rides on track 16a, and the other of which rides on track 16b. The first blade-carrying combination includes a cutting blade 30a, a hold-down clip 34a, a variable-depth blade arm 73, variable-depth gearing 79, and a clip lock-down nut 36a. Similarly, the second blade-carrying combination includes a cutting blade 30b, a hold-down clip 34b, a variable-depth blade arm 73, variable-depth gearing 79, and a clip lock-down nut 36b. A pin 75 is disposed through the blade arm and through the rotational axis of the associated circular blade. The blade arm and pin hold and impart rotational ability to the associated blade. Each hold-down clip houses the wheel blade, the blade arm, the pin, the gearing, and the clip lock-down nut. Each blade mechanism, especially its blade arm and left-hand/right-hand (LH/RH) gearing, affords adjustability of the depth of the associated blade.

The structural integrity of cutting assembly 10, particularly in terms of strength and stability of support structure 12, is a requisite of typical inventive practice. The present invention's cutting unit 10 must be structurally suitable to permit and tolerate the physical forces concomitant inventive cutting activity. With reference to FIG. 5, plural-member cutting unit 120 includes a horizontal base (e.g., base plate) 13 and triplicate vertical parallel M-shaped sectional plates, viz., 12x, 12y, and 12z. Sectional plates 12x and 12z are on the ends, and sectional plate 12y is in the middle. The sectional plates are spaced apart and mounted on the base 13, which has a large footprint to promote stability. According to typical inventive practice of a plural-member unit 120, one of the three sectional plates is a "cutter" sectional plate and is coupled with a cross-member 14, such as shown in FIG. 1 and FIG. 2.

For instance, a propitious inventive arrangement is to have a cutter sectional plate 12x, a "roller" sectional plate 12y, and a "blank" sectional plate 12z. Sectional plate 12z is mechanically unadorned. Sectional plate 12y is equipped with blades 30a and 30b and, through combination with cross-member 14, is also equipped with blade 30c. Sectional plate 12x is equipped with rollers 39 in the angled edges of its V-notch; the rollers rotate in direction L and serve to facilitate the cutting action of the blades that are associated with sectional plate 12y, in particular by preventing binding of cable 100 during the cutting activity. The plural-member unit 120 shown in FIG. 5 is merely an example of diverse structural plural-member cutting configurations that can be efficaciously practiced in accordance with inventive principles, which can vary numerically and configurationally.

Figure 6:
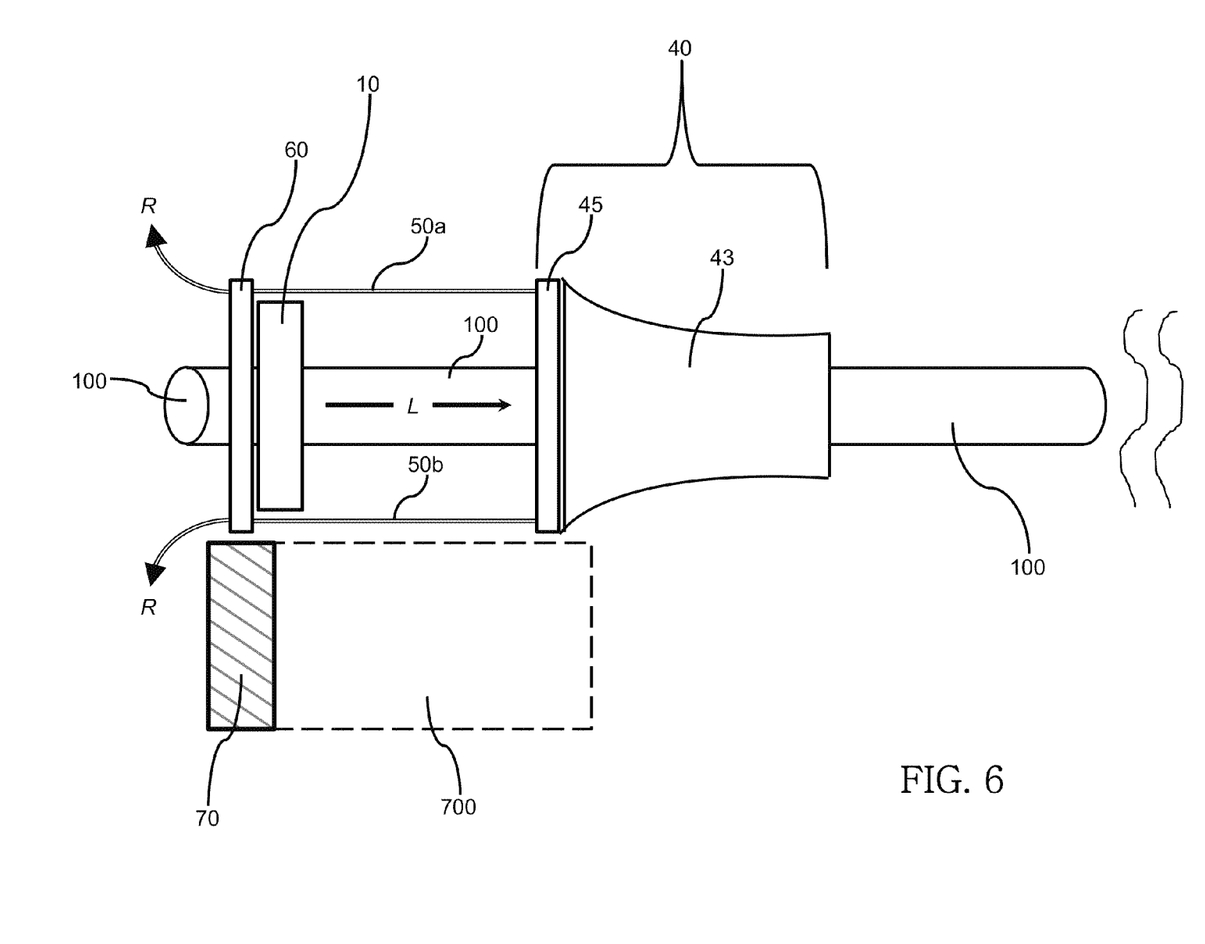
FIG. 6 is a side cable-longitudinal elevation view of an embodiment of an inventive cable-cutting device such as may include the cutting component depicted in FIG. 1 and FIG. 2, the cable-gripping component shown in FIG. 7, and the wire-ratcheting component shown in FIG. 8.
Figure 7:
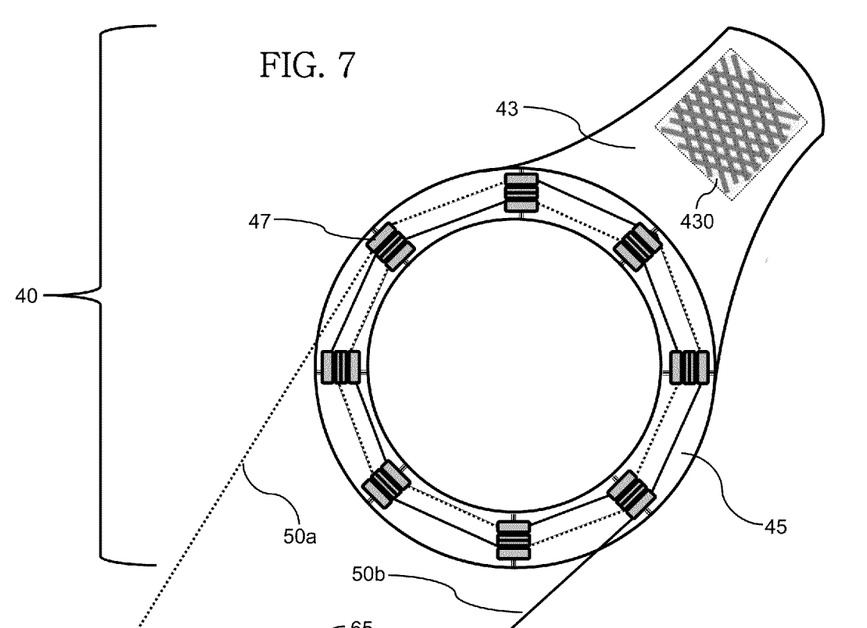
FIG. 7 is a perspective view of an embodiment of a cable-gripping component such as may be included in the inventive cable-cutting device depicted in FIG. 6.
Figure 8:
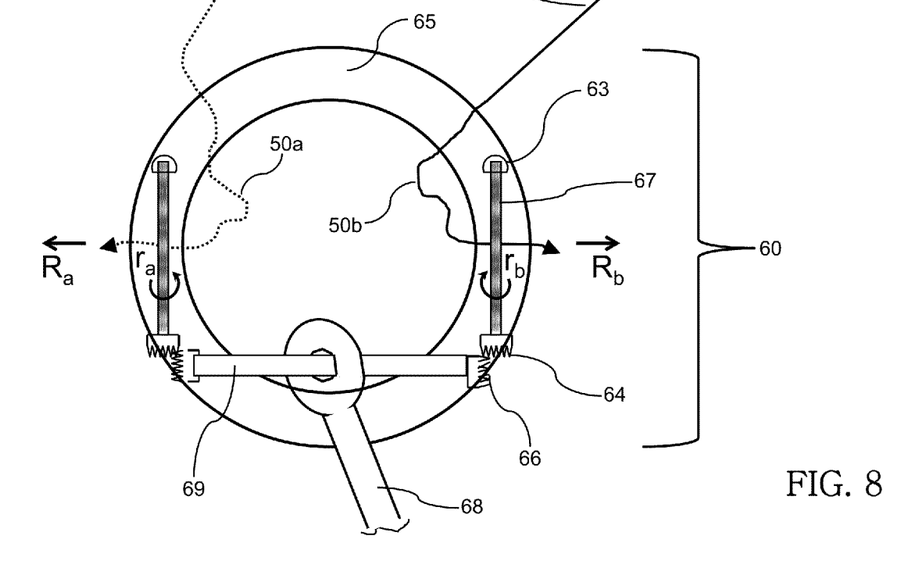
FIG. 8 is a perspective view of an embodiment of a wire-ratcheting component such as may be included in the inventive cable-cutting device depicted in FIG. 6.

Reference now being made to FIG. 6 through FIG. 8, cable 100 is positioned through cable-clamping mechanism 40, which includes a gripping element 43 and an annular rigid (e.g., metal) grip-plate 45. Gripping element 43 normally is generally cylindrical but adopts a generally curvilinear-frustoconical shape by virtue of the coupling of gripping element 43 with annulus 45, which has a larger-diameter than has Kellum gripping element 43. Kellum gripping element 43 is essentially or primarily made of a suitable wire-mesh material (diagrammatically represented as wire-mesh material 430 in FIG. 6) for achieving the Kellum gripping effect.

In its basic concept, a "Kellum grip" 43 is conventionally known, sometimes referred to as a "Kellum puller" or a "Chinese finger toy." Essentially, the Kellum grip 43 is a hollow, generally cylindrical device principally constituted by a mesh of wires 430 that are diagonally configured so that axial-longitudinal expansion of the device results in diametric contraction, and axial-longitudinal contraction of the device results in diametric expansion. For instance, if a person inserts a left-hand finger in one end of a Kellum grip toy and a right-hand finger in the opposite end of the toy, the toy will tighten when the fingers pull away from each other, and will loosen when the fingers push toward each other (the loosening of the toy thus permitting release of the two fingers).

Grip-plate 45 is a ring-shaped endplate that is coaxially attached to Kellum gripping element 43 at the larger-diameter end of Kellum gripping element 43. Distanced from grip-plate 45 are the cutting assembly 10 and the ratcheting mechanism 60, which includes an annular rigid (e.g., metal) ratchet-plate 65. Cutting assembly 10 is situated adjacent to the ratcheting mechanism 60 and between the ratcheting mechanism 60 and the cable-clamping mechanism 40. Both the grip-plate 45 and the ratchet-plate 65 are ring-shaped to accommodate the cable 100 passing axially through their respective centric openings.

As shown in FIG. 6, the cutting assembly's support plate 12 abuts the ratcheting plate 65. According to typical inventive practice, the cutting unit is closely associated with the ratcheting mechanism. Depending on the inventive embodiment, the cutting unit can be either coupled with, or separate from, the ratcheting mechanism. For instance, FIG. 6 can be thought of as depicting either attachment (such as mechanically, e.g., with bolts, or adhesively) or nonattachment of the ratcheting mechanism's ratcheting plate 65 and the cutting assembly's support plate 12 with respect to each other.

In typical inventive practice, the cabling with respect to which the inventive device is used is quite lengthy (e.g., hundreds or thousands of feet long). The heavy weight of the cable therefore serves to immobilize the cable when the cable is in place. The lengthy cable may be put in place via winching or other machinery, prior to using the inventive device. A benefit attendant "self-immobilization" of heavy cabling is that a single practitioner can implement the inventive device.

Nevertheless, the present application can be practiced with respect to cable of practically any length. If the cable is a short cable segment, or is otherwise of such size or mass that it does not completely "weigh itself down," it may be necessary to render stationary the cable clamping/gripping mechanism 40. Depending on the inventive embodiment, this immobilization may be accomplished in any of various external ways. For instance, a person can manually hold, or hold down upon a stationary object or foundation surface, the cable-clamping mechanism; however, if the immobilization of the cable-clamping mechanism is performed solely by human hand, a second person would normally be needed to perform the ratcheting of the tension wires.

It is often preferable that one person operate the inventive device. A non-manual inventive approach to external immobilization is to use a fastener and/or a housing to mechanically and/or gravitationally secure the cable-clamping mechanism with respect to a stationary object or foundation surface therebelow. Depending on the inventive embodiment, these ways of securing may be assisted manually.

It is reemphasized that typical inventive practice is characterized by self-immobilization of heavy cabling, thus obviating the need for external immobilization, and thus permitting inventive operation by a single operator. Less typical inventive practice provides for external immobilization, and the various inventive techniques for externally fixing the cable-clamping mechanism are collectively symbolized as immobilizer 70 in FIG. 6. According to some such inventive embodiments, an inanimate immobilizer 70 is incorporated into a comprehensive housing 700, which essentially houses the entire inventive device, thereby serving to immobilize the cable-clamping mechanism. A comprehensive housing 700 can be provided with rails (not shown) for controlling and facilitating movement of the ratchet-and-cutter tandem toward the cable-clamping mechanism.

Two wires, viz., wires 50a and 50b, connect the ratcheting mechanism and the cable-clamping mechanism to each other. Regardless of whether or not the ratcheting mechanism and the cutting assembly are coupled, typical inventive practice provides for essentially the same important operative principle, namely, that the interaction of the ratcheting mechanism, the wires, and the cable-clamping mechanism motivates the ratcheting mechanism, and hence, the cutting assembly, toward the cable-clamping mechanism.

As illustrated in FIGS. 6 through 8, ratcheting of wires 50a and 50b in direction R via ratcheting mechanism 60 results in movement of cutting assembly 10 in direction L, which essentially is along the longitudinal axis l of cable 100. Each of wires 50a and 50b is disposed circumferentially around endplate 45 and through plural (e.g., eight, as shown in FIG. 7) small pulleys 47, which are mounted upon and equidistantly spaced around the flat surface of endplate 45. Each wire engages the pulleys 47 in alternating fashion, above and below the pulleys 47. At its opposite end, each wire engages ratcheting mechanism 60, which includes toothed parts.

Ratcheting mechanism 60 includes ratchet-plate 65, two rod-mounts 63, two wire-pulling rods 67, an initial-turning rod 69, and a handle 68. Wire-pulling rods are parallel to each other and perpendicular to initial-turning rod 69. Each wire-pulling rod 67 is mounted on one end via the mount 63, and has a cog 64 at its opposite end. Initial-turning rod 69 has a cog 66 at each of its opposite ends. When perpendicular rod 69 is turned (axially rotated, e.g., manually) via handle 68, each of the two cogs 66 engages a cog 64, causing the corresponding wire-pulling rod 63 to simultaneously turn (axially rotate) in rotational directions $r_a$ and $r_b$. A reduction gear (not shown) reduces the turning speed of the driven gear element, rod 69, vis-à-vis the turning speed of the driver gear element, handle 68.

Concomitant with the simultaneous rotations $r_a$ and $r_b$ is the simultaneous ratcheting of wires 50a and 50b in generally linear directions $R_a$ and $R_b$, respectively. In turn, concomitant with the ratcheting of wires 50a and 50b is the continuous kinetic shortening of the distance between the cutting assembly's support structure 12 and the clamping mechanism's grip-plate 45. In other words, during the ratcheting of the wires 50a and 50b, the cutting assembly 10 moves toward the gripping mechanism 40. Concomitant with the movement of the cutting assembly 10 toward the gripping mechanism 40 is the cutting by the three blades 30a, 30b, and 30c in direction L, which is along the longitudinal axis l of the cable 100. Accordingly, three parallel incisions are respectively produced in cable jacket 101 by the three rotating cutting blades 30a, 30b, and 30c.

The three parallel incisions having been inventively produced in cable jacket 101, the inventive device is decoupled from the cable 100, thus freeing the cable 100. A conventional hand tool can now be used circularly with respect to the cable 100. A circumferential incision is rendered that crosses the three parallel incisions in the cable jacket 101, thereby effecting complete separation of a segment of cable jacket 101 from the rest of the cable 100.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A cable incision device comprising:
    a generally M-shaped member having an isosceles triangular notch characterized by a vertical geometric bisector, a first angled edge, and a second angled edge, the angled edges meeting at the geometric apex of the notch;
    a horizontal cross-member attached to the generally M-shaped member so as to traverse the triangular notch, the cross-member perpendicular to the bisector and positionally adjustable along the vertical bisector;
    a first blade, associated with and perpendicular to the first edge and positionally adjustable along the first angled edge;
    a second blade, associated with and perpendicular to the second edge and positionally adjustable along the second angled edge;
    a third blade, associated with the bar, coincident with the vertical bisector and positionally adjustable along the vertical bisector in accordance with the positional adjustability of the cross-member along the vertical bisector;
    a Kellum-based mechanism capable of gripping a segment of a cable, the cable including a longitudinal axis;
    a ratcheting mechanism adjoining the generally M-shaped member; and
    plural wires connecting the Kellum-based mechanism to the ratcheting mechanism, the ratcheting mechanism capable of ratcheting the wires so that the generally M-shaped member is caused by the ratcheting to move toward the Kellum-based mechanism;
    wherein steps including gripping the cable, placing the cable through the notch, adjusting at least one of the first blade, the second blade, and the third blade, and ratcheting the wires result in three parallel incisions in the cable along the longitudinal axis of the cable, the first incision made by the first blade, the second incision made by the second blade, the third incision made by the third blade.

2. The cable incision device of claim 1 wherein the first blade is positionally adjustable perpendicular to the first angled edge, and wherein the second blade is positionally adjustable perpendicular to the second angled edge.

3. The cable incision device of claim 1 wherein the adjusting of at least one of the first blade, the second blade, and the third blade is in furtherance of configuring the first blade, the second blade, and the third blade for effectuating the three parallel incisions in the cable along the longitudinal axis of the cable.

4. The cable incision device of claim 1 wherein each of the first blade, the second blade, and the third blade is a wheel blade rotatable for making an incision along the longitudinal axis of the cable placed through the notch.

5. The cable incision device of claim 4 wherein the first blade is positionally adjustable perpendicular to the first angled edge, and wherein the second blade is positionally adjustable perpendicular to the second angled edge.

6. The cable incision device of claim 5 wherein the adjusting of at least one of the first blade, the second blade, and the third blade is in furtherance of configuring the first blade, the second blade, and the third blade for effectuating the three parallel incisions in the cable along the longitudinal axis of the cable.

7. The cable incision device of claim 5 wherein the three parallel incisions are approximately equal in length, and wherein the length can be selected prior to effectuating the three parallel incisions in accordance with the distance between the M-shaped member and the Kellum-based mechanism.

8. An apparatus for incising a cable, the apparatus comprising:
    a Kellum gripping device;
    a ratcheting device;
    at least two wires connecting said Kellum gripping device and said ratcheting device; and
    a blade assembly adjoining said ratcheting device and interposed between said ratcheting device and said Kellum gripping device, said blade assembly including a vertical V-notched plate, a horizontal bar, and at least three wheel blades, said V-notched plate having an upwardly open V-notch geometrically describing an isosceles triangle lying in a vertical plane and having two equal sides, a horizontal base above the two equal sides, and a vertical bisector between the two equal sides, said horizontal bar attached to said V-notched plate and extending across the V-notch, the three wheel blades spaced apart so as to respectively correspond to the two equal sides and horizontal base of the isosceles triangle, each wheel blade rotatable perpendicular to the geometric plane;
    wherein, while a cable is secured by the Kellum gripping device and is positioned through the V-notch with the wheel blades contacting the cable, ratcheting of the wires by the ratcheting device causes the ratcheting device together with the blade assembly to approach the Kellum gripping device, the wheel blades thereby incising the cable to form three parallel cable-lengthwise cuts in the cable.

9. The apparatus for incising of claim 8 wherein:
    said at least three wheel blades include a vertical said wheel blade, a first oblique said wheel blade, and a second oblique said wheel blade, the vertical said wheel blade coupled with the bar.

10. The apparatus for incising of claim 9 wherein:
    the horizontal bar and hence the vertical said wheel blade is adjustable in a direction along the vertical bisector of the V-notch;
    the first oblique said wheel blade is adjustable both in a direction along and a direction perpendicular to the first equal side of the V-notch;
    the second oblique said wheel blade is adjustable both in a direction along and a direction perpendicular to the second equal side of the V-notch.

11. The apparatus for incising of claim 9 wherein the cuts are about equal in cut length, and wherein the cut length comports with the distance traveled by the blade assembly in approaching the Kellum gripping device.

\* \* \* \* \*